United States Patent
Kuntze et al.

(10) Patent No.: US 7,311,320 B2
(45) Date of Patent: Dec. 25, 2007

(54) ONE PIECE RUNNING BOARD BRACKET

(75) Inventors: Christopher John Kuntze, Clarkston, MI (US); David Alan Smith, Macomb Township, MI (US); Matthew Philip Brooks, Wyandotte, MI (US)

(73) Assignee: Magna International Inc., Aurora, Ontario (CA)

( * ) Notice: Subject to any disclaimer, the term of this patent is extended or adjusted under 35 U.S.C. 154(b) by 55 days.

(21) Appl. No.: 11/252,173

(22) Filed: Oct. 17, 2005

(65) Prior Publication Data
US 2007/0085376 A1    Apr. 19, 2007

(51) Int. Cl.
*B60R 3/00* (2006.01)
(52) U.S. Cl. ............... 280/163; 280/164.1; 280/164.2; 280/165; 280/166; 280/169
(58) Field of Classification Search ............... 280/163, 280/164.1, 164.2, 165, 166, 169
See application file for complete search history.

(56) References Cited

U.S. PATENT DOCUMENTS

| | | | | |
|---|---|---|---|---|
| 2,077,822 A | * | 4/1937 | Baker | ............ 343/712 |
| 5,823,553 A | * | 10/1998 | Thompson | ............ 280/164.1 |
| 6,536,790 B1 | * | 3/2003 | Ojanen | ............ 280/163 |
| 6,688,621 B2 | * | 2/2004 | Benirschke | ............ 280/163 |
| 2004/0173987 A1 | * | 9/2004 | Chapman et al. | ............ 280/163 |
| 2004/0256832 A1 | * | 12/2004 | Bradsen et al. | ............ 280/163 |

FOREIGN PATENT DOCUMENTS

JP    359032535 A * 2/1984 ............ 280/166

* cited by examiner

*Primary Examiner*—Christopher P. Ellis
*Assistant Examiner*—John R. Olszewski
(74) *Attorney, Agent, or Firm*—Clark Hill PLC

(57) ABSTRACT

A bracket assembly secures a running board to a rocker panel, which includes a pinch weld depending therefrom. The bracket assembly includes a receiving panel adapted to have the running board fixedly secured thereto. A rocker securing plate extends out from the receiving panel and is secured to the rocker panel. An intermediate securing tab extends outwardly between the receiving panel and the rocker securing plate for securing the bracket assembly to the pinch weld outboard thereof.

13 Claims, 4 Drawing Sheets

ONE PIECE RUNNING BOARD BRACKET

BACKGROUND ART

1. Field of the Invention

The invention relates to running boards which are fixedly secured to the sides of a motor vehicle. More particularly, the invention relates to the bracket that supports the running board with respect to the motor vehicle.

2. Description of the Related Art

Running boards are elongated steps that run along the side or sides of a motor vehicle. The running boards are used principally with motor vehicles that are elevated in height, e.g., pickup trucks and sport utility vehicles, to help those entering or exiting the passenger compartment. The running boards have various designs. They may have an aesthetic quality that varies. Regardless of the aesthetics, the principal purpose of the running board is to provide an intermediate step between the ground and the inside of the passenger compartment.

Running boards are typically secured to the motor vehicle using a bracket. The bracket is typically designed to include a number of pieces. The reason for the multiple piece bracket configuration is that it is difficult to obtain access to the portions of the motor vehicle that the bracket is required to be attached without doing it in parts. In addition, multiple piece brackets are required to secure the bracket to an outboard side of a pinch weld below the rocker panel of the motor vehicle, the desired configuration and placement of the bracket to the rocker panel. Having multiple parts for the bracket assembly increases the requirements for inventory and assembly. There is a need in the art to minimize both the inventory and the amount of time it takes to secure a running board to the motor vehicle.

SUMMARY OF THE INVENTION

A bracket assembly secures a running board to a rocker panel, which includes a pinch weld depending therefrom. The bracket assembly includes a receiving panel adapted to have the running board fixedly secured thereto. A rocker securing plate extends out from the receiving panel and is secured to the rocker panel. An intermediate securing tab extends outwardly between the receiving panel and the rocker securing plate for securing the bracket assembly to the pinch weld outboard thereof.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENTS

Figure 1:
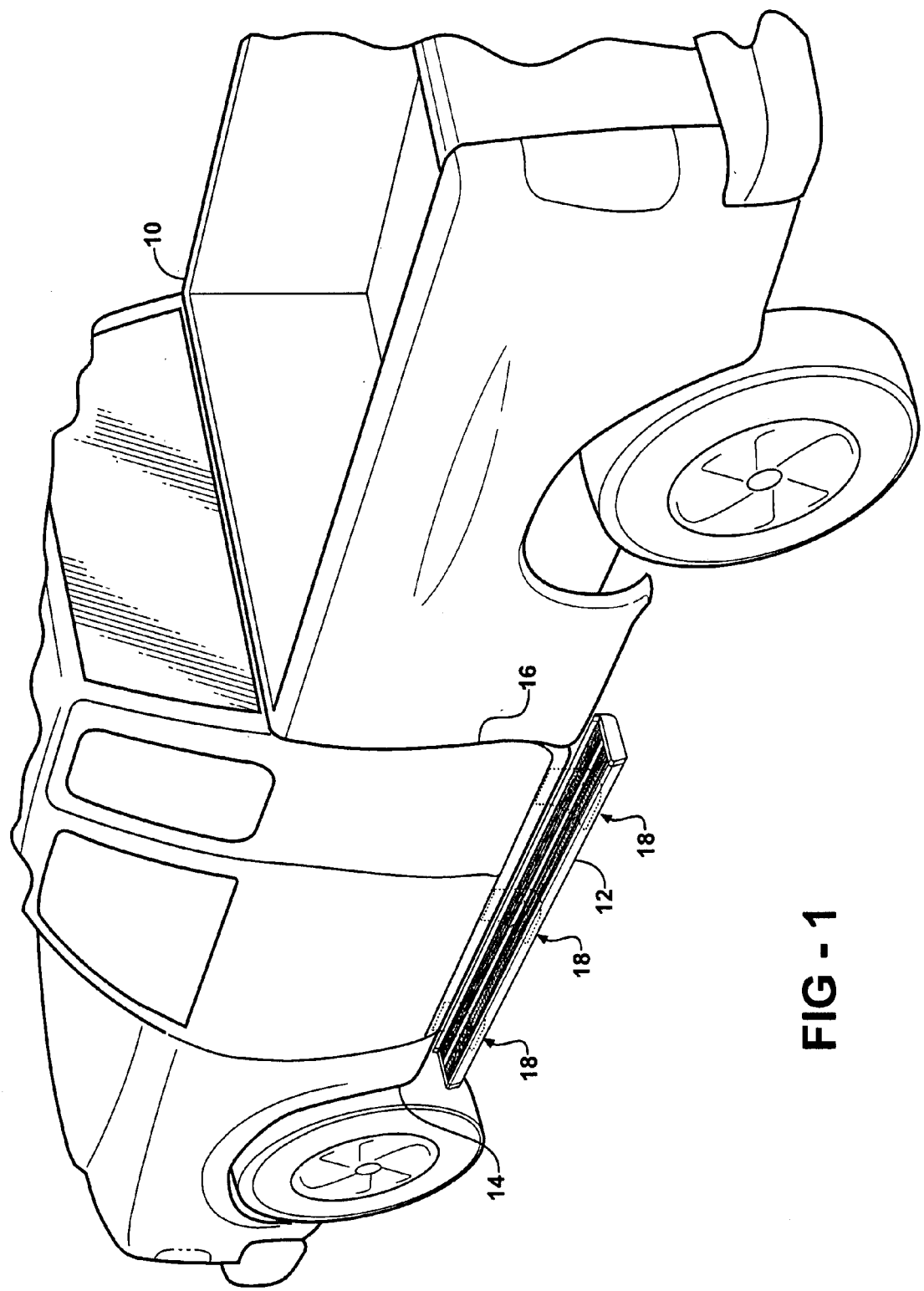
FIG. 1 is a fragmentary perspective view of the invention secured between a rocker panel and a motor vehicle.

Referring to FIG. 1, a motor vehicle 10 is shown with a running board 12 secured thereto just under the driver side doors 14, 16. The invention, a one-piece bracket or bracket assembly, is generally indicated at 18. There are three bracket assemblies 18, all shown in phantom, that secure the running board 12 to the motor vehicle 10. It should be appreciated by those skilled in the art that while the motor vehicle 10 is shown to be of the pickup variety, any type of motor vehicle 10 may include a running board 12 which is secured to the motor vehicle 10 using the bracket assembly 18.

Figure 2:
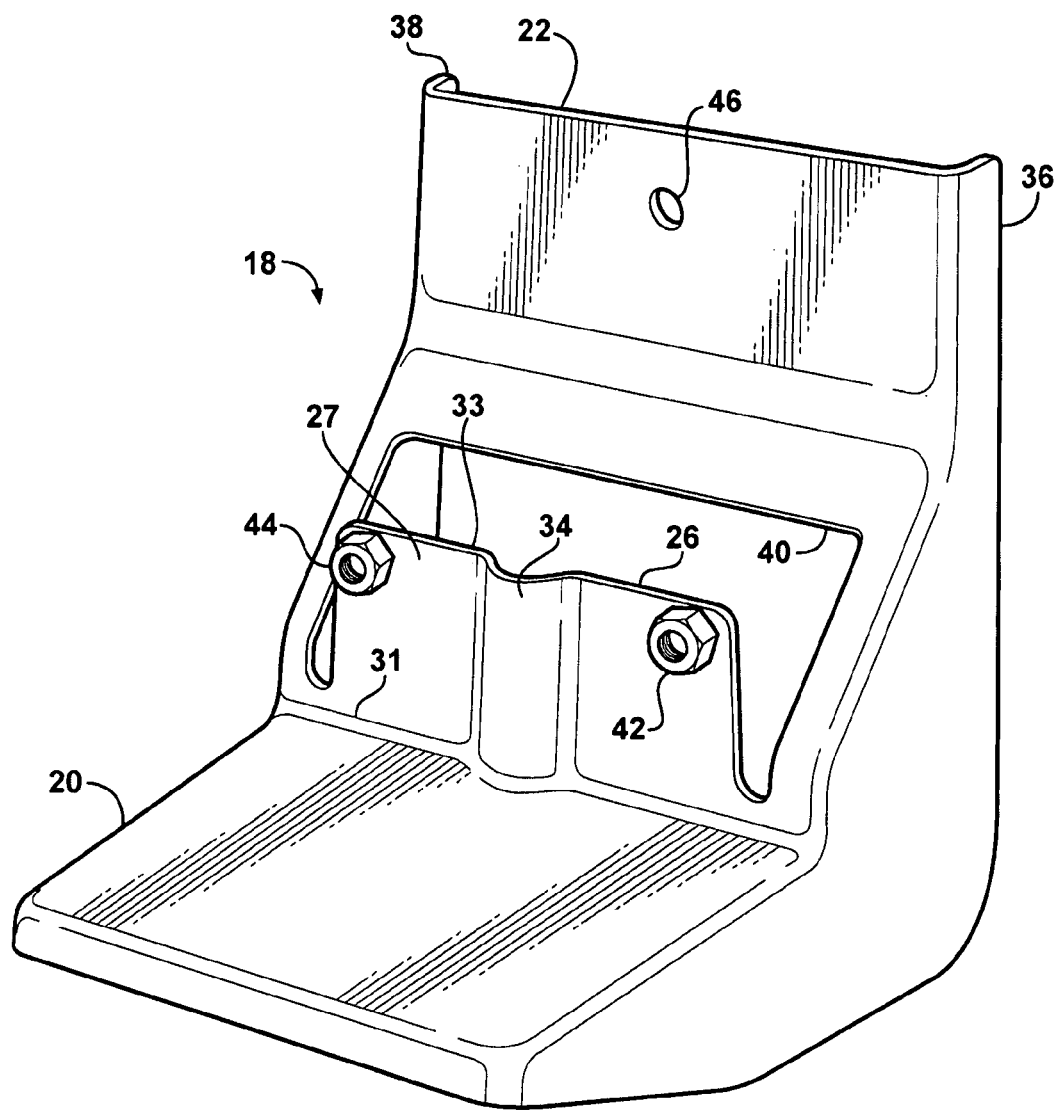
FIG. 2 is a perspective view of one embodiment of the bracket assembly.

Referring to FIG. 2, a bracket assembly according to the first embodiment is shown. The bracket assembly includes a receiving panel 20 that is adapted to have the running board 12 fixedly secured thereto. When the bracket assembly 18 is secured to the motor vehicle 10, the receiving panel 20 is generally parallel to the ground on which the motor vehicle 10 is driving over. The receiving panel 20 may have a number of configurations depending on the actual design of the running board 12.

The bracket assembly 18 also includes a rocker securing plate 22. The rocker securing plate 22 extends out from the receiving panel 20 and is secured to the rocker panel 24 (shown in FIGS. 3 and 4). The rocker securing plate 22 is designed to be secured to the rocker panel 24 inboard thereof. The way in which the rocker securing plate 22 is secured to the rocker panel 24 is discussed in greater detail subsequently.

The bracket assembly 18 also includes an intermediate securing tab 26 having an outboard surface 27 and an inboard surface 29. The intermediate securing tab 26 extends out between the receiving panel 20 and the rocker securing plate 22. The intermediate securing tab 26 includes a bottom portion 31 that abuts against the receiving panel 20. The intermediate securing tab 26 also includes a top edge 33 that does not contact any other portion of the bracket assembly 18. Thus, the top edge 33 of the intermediate securing tab 26 is spaced apart from the rocker securing plate 22. The intermediate securing tab 26 secures the bracket assembly 18 to a pinch weld 28 (shown in FIGS. 3 and 4) which extends downwardly from the rocker panel 24. In the embodiment shown, the pinch weld 28 includes a bottom edge of two rocker sides 30, 32 that come together to form the rocker panel 24. The intermediate securing tab 26 is oriented such that it is fixedly secured to the pinch weld 28 outboard. The intermediate securing tab 26 includes a strengthening rib 34 extending along the heighth of the intermediate securing tab 26 to provide additional strength in the bracket assembly 18.

The bracket assembly 18 also includes strength flanges 36, 38. The strength flanges 36, 38 extend along the entire bracket assembly on either side thereof. The strength flanges 36, 38 provide additional strength to the bracket assembly 18 to ensure that it will support the load placed on the running board 12.

The bracket assembly 18 and, more particularly, the rocker securing plate 22 defines an access opening 40. The access opening 40 provides access to the intermediate securing tab 26 when securing the intermediate securing tab 26 to the pinch weld 28. In the embodiment shown, the access opening 40 almost extends between the two strength flanges 36, 38. It should be appreciated by those skilled in the art that the access opening could be small to accommodate the access without reducing any strength requirements required by the bracket assembly 18.

Two nuts 42, 44 are fixedly secured to the outboard surface of the intermediate securing tab 26 so that an installer would not have to reach around the intermediate securing tab 26 to hold the nuts 42, 44 in place.

In the first embodiment, the bracket assembly 18 includes a primary opening 46 in the rocker securing plate 22. The primary opening 46 allows a bolt to extend therethrough and into the rocker panel 24.

Figure 3:
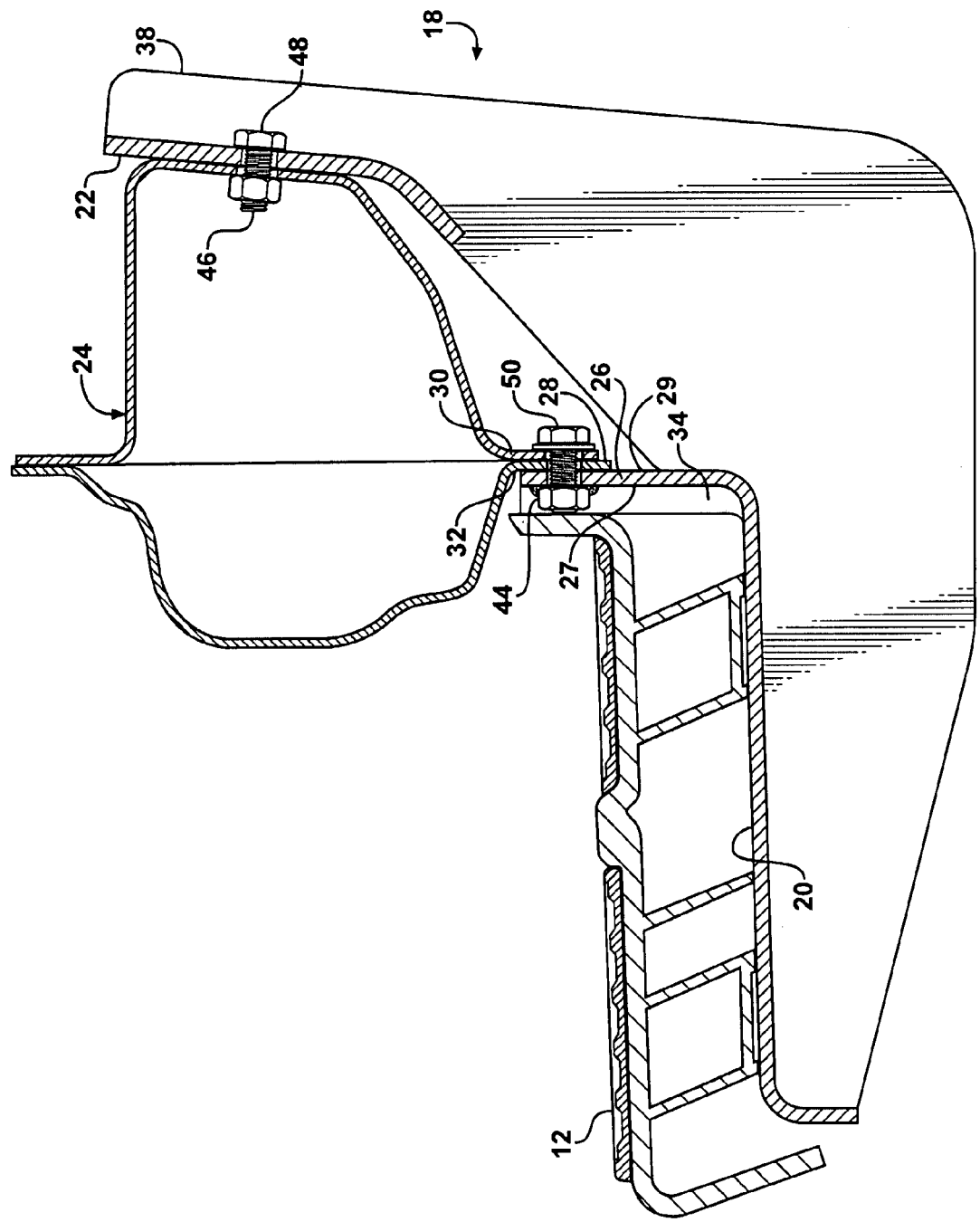
FIG. 3 is a cross-sectional side view of the embodiment shown in FIG. 2 secured to a rocker panel and having a running board secured thereto.

A second view of the first embodiment is shown in FIG. 3 with the bracket assembly 18 secured to a rocker panel and a running board 12 secured to the bracket assembly 18. A primary bolt 48 is extended through the primary opening 46 to secure the bracket assembly 18 to the rocker panel. In addition, secondary bolt 50 is secured through the pinch weld 28 and into the intermediate securing tab 26 via the nut 44. Both the primary bolt 48 and the secondary bolt 50 may be inserted into position in securing the bracket assembly 18 to the rocker panel 24 from the inboard rocker side 30 of the rocker panel 24. In the embodiment shown, there are two secondary bolts 50.

Figure 4:
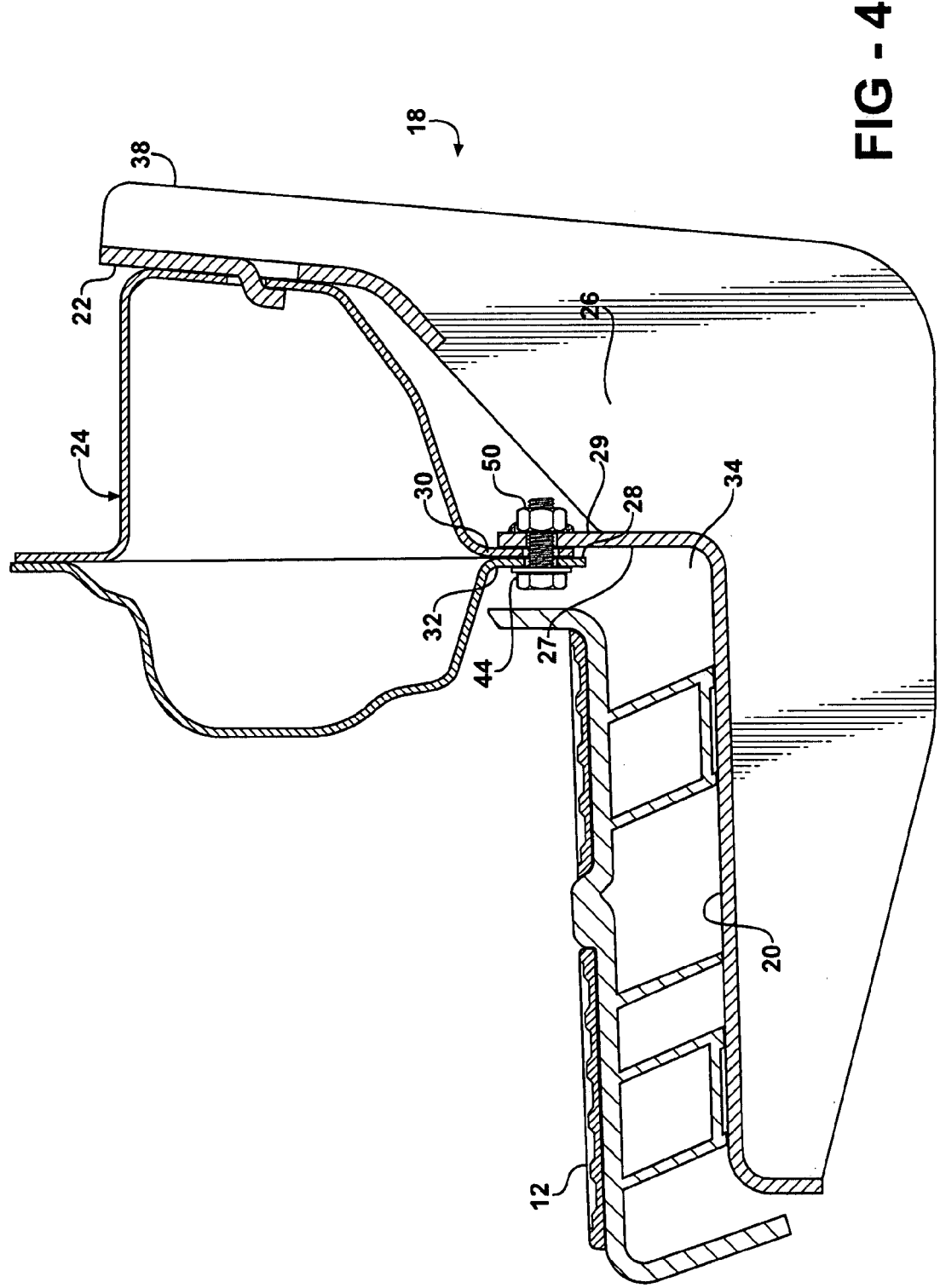
FIG. 4 is a cross-sectional side view of a second embodiment of the invention secured to a rocker panel and a running board.

Referring to FIG. 4 wherein like prime numerals represent elements similar to those in the first embodiment, a second embodiment of the bracket assembly is generally indicated at 18'. The difference between the first embodiment of the bracket assembly 18 and the second embodiment of the bracket assembly 18' is that the primary opening 46 in the first embodiment is replaced with a hook 52. The hook 52 extends through a rocker hole 53 in the inboard rocker side 30' of the rocker panel 34' and allows the bracket assembly 18' to hang in place until the secondary bolts 50' may be inserted through the pinch weld 28'. The relationship between the secondary bolts 50' and the hook 52 provide a positive securement of the bracket assembly 18' to the rocker panel 24'. The hook 52 engages an inner surface 54 created by the rocker hole 53 in the inboard rocker side 30' of the rocker panel 24'.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

We claim:

1. A bracket assembly for securing a running board to a rocker panel having a pinch weld depending therefrom, said bracket assembly comprising:
   a receiving panel adapted to have the running board fixedly secured thereto;
   a rocker securing plate extending out from said receiving panel and secured directly to the rocker panel; and
   an intermediate securing tab extending out from said receiving panel and abutting thereagainst for securing said bracket assembly to the pinch weld outboard thereof.

2. A bracket assembly as set forth in claim 1 wherein said rocker securing plate defines an access opening to provide access to said intermediate securing tab when securing said intermediate securing tab to the pinch weld.

3. A bracket assembly as set forth in claim 2 wherein said rocker securing plate includes a hook to engage the rocker panel and allow said bracket assembly to hang when installing said bracket assembly.

4. A bracket assembly as set forth in claim 3 including strength flanges extending out from either side of said bracket assembly perpendicular to said rocker securing plate, said receiving panel and said intermediate securing tab.

5. A bracket assembly for securing a running board to a rocker panel having a pinch weld depending therefrom, said bracket assembly comprising:
   a receiving panel adapted to have the running board fixedly secured thereto;
   a rocker securing plate extending out from said receiving panel, said rocker securing plate including a hook to engage the rocker panel to be secured directly thereto; and
   an intermediate securing tab extending outwardly from said receiving panel for securing said bracket assembly to the pinch weld outboard thereof, said intermediate securing tab having a bottom portion abutting against said receiving panel and a ton edge spaced apart from said rocker securing plate.

6. A bracket assembly as set forth in claim 5 including strength flanges extending out from either side of said bracket assembly perpendicular to said rocker securing plate, said receiving panel and said intermediate securing tab.

7. A bracket assembly as set forth in claim 6 wherein said rocker securing plate defines an access opening extending between said strength flanges to provide access to said intermediate securing tab to the pinch weld.

8. A bracket assembly as set forth in claim 1 wherein said intermediate securing tab includes a top edge spaced apart from said rocker securing plate.

9. A bracket assembly as set forth in claim 8 wherein said intermediate securing tab includes an outboard surface including at least one nut fixedly secured thereto to facilitate mounting of said bracket assembly to the pinch weld outboard thereof.

10. A bracket assembly as set forth in claim 5 wherein said intermediate securing tab includes an outboard surface including at least one nut fixedly secured thereto to facilitate mounting of said bracket assembly to the pinch weld outboard thereof.

11. A one-piece bracket for securing a running board to a rocker panel having a pinch weld depending therefrom, said one-piece bracket comprising:
   a receiving panel adapted to have the running board fixedly secured thereto;
   a rocker securing plate extending out from said receiving panel and directly secured to the rocker panel; and
   an intermediate securing tab extending outwardly between said receiving panel and said rocker securing plate, said intermediate securing tab having an outboard surface including at least one nut fixedly secured thereto to facilitate mounting of said one-piece bracket to the pinch weld outboard thereof.

12. A one-piece bracket as set forth in claim 11 wherein said intermediate securing tab extends out from and abuts against said receiving panel.

13. A one-piece bracket as set forth in claim 12 wherein said intermediate securing tab includes a top edge spaced apart from said rocker securing plate.

* * * * *